April 28, 1936. F. T. IRGENS Re. 19,949
CHARGE CONTROLLING DEVICE FOR INTERNAL COMBUSTION ENGINES
Original Filed March 14, 1931
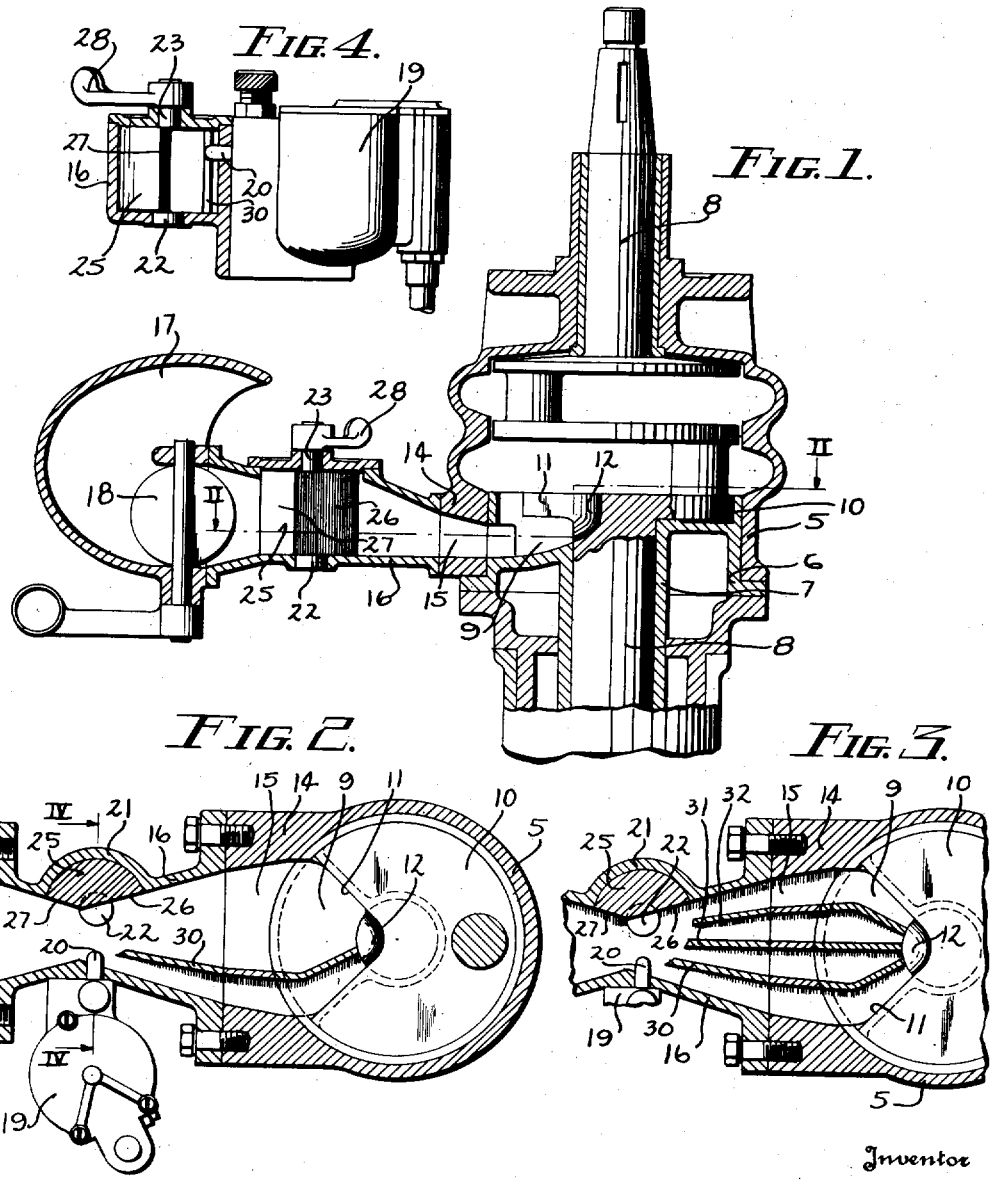
Inventor
Fum T. Irgens
By Wheeler, Wheeler & Wheeler
Attorneys Reissued Apr. 28, 1936

Re. 19,949

UNITED STATES PATENT OFFICE 19,949

CHARGE CONTROLLING DEVICE FOR INTERNAL COMBUSTION ENGINES

Finn T. Irgens, Wauwatosa, Wis., assignor to Outboard Motors Corporation, Milwaukee, Wis., a corporation of Michigan Original No. 1,887,204, dated November 8, 1932, Serial No. 522,746, March 14, 1931. Application for reissue October 26, 1935, Serial No. 46,927

9 Claims. (Cl. 123—73)

This invention relates to improvements in charge controlling devices for internal combustion engines.

The invention has particular application to two cycle engines in which charge admission to the crank case is governed by a rotary valve of the disk or sleeve type. By way of example, I have illustrated the invention in connection with the crank case of an outboard motor engine, using a disk valve integral with one of the crank cheeks.

It is the primary object of the invention to provide uniform conditions for the delivery of the charge to the crank case at all engine speeds. I propose to further this object by providing partitions in the manifold, subdividing it into a plurality of passages which are successively opened or closed by the throttle valve whereby charge velocity through any given passage will approach a substantially constant value.

Where the invention is not carried to its ultimate form I propose at least to increase charge velocities at low engine speeds by providing a restricted passage made available at such speeds, and in which the charge is so far confined that its velocity will approximate the velocity in the entire manifold at full engine speeds. Thus, I provide optimum conditions for trolling or idling the engine while at the same time retaining all factors making for optimum conditions at maximum speeds.

It is my further purpose to arrange the charge controlling device in such a manner with reference to the carburetor nozzle and throttle valve as to ensure proper carburetion to meet the various conditions under which the several manifold passages function.

In the drawing:

Figure 1 is a vertical axial section through a carburetor and manifold applied to an internal combustion engine, crank case, and rotary valve assembly in accordance with this invention.

Figure 2 is a section taken in the planes indicated at 2—2 in Fig. 1.

Figure 3 is a view similar to Fig. 2 showing a modified embodiment of the invention.

Figure 4 is a view taken in section in the plane indicated at 4—4 in Fig. 2.

Like parts are identified by the same reference characters throughout the several views.

The outboard motor crank case 5 is provided with an end closure cap 6 which includes a bearing 7 for crank shaft 8 and a passage 9 leading to the interior of the crank case from the front thereof, and terminating in a port across which the disk valve 10 operates.

Valve 10 comprises one cheek of a crank structure and is cut away to provide a sector shaped opening at 11 registering with the port at the end of passage 9. In order to increase the area available for the admission of the charge to the crank case, the opening 11 is preferably extended into the projected periphery of crank shaft 8, as shown at 12 in Figs. 1, 2 and 3.

The crank case 5 has a forwardly projecting boss at 14 with a passage 15 registering with passage 9 in the crank case closure 6. Bolted to the boss is a carburetor and manifold assembly 16 carrying an air inlet fitting 17 within which a choke valve 18 operates. The usual float chamber 19 is mounted on the side of the manifold assembly 16 and has a carburetor nozzle at 20 projecting through the restricted portion of the manifold, as shown in Figs. 2, 3 and 4.

Across from the jet the manifold wall extends in the form of a sector of a cylinder as shown at 21, and within this wall portion is closely fitted, for rotation on lower and upper trunnions 22 and 23, a throttle valve 25 whose inner faces 26 and 27, in the open position of the valve, comprise angularly related extensions of the adjacent inner wall surfaces of the manifold passage. The apex of these faces is directly opposite the apex of the passage at one side of which the carburetor nozzle 20 projects into the passage. The outer periphery of the valve is complementary to the inner surface of the cylindrical sector in which the valve is positioned when open. A handle 28 on trunnion 23 facilitates manipulation of the valve.

The passage through manifold 16 and the registering passages 15 and 9 leading to the engine crank case, are herein designated in their entirety as a manifold passage. In accordance with the present invention the said passage is subdivided by one or more partitions, preferably extending to valve 10 at their inner ends, and to the throttle valve 25 at their outer ends. In the Fig. 2 construction a single partition of this sort is employed at 30, being made up of independent webs registering in the several metallic elements above described.

It will be noted that the partition 30 is so disposed as to follow approximately the contour of one side wall of the passage, being much closer to said wall than to the other side wall of the manifold passage. The wall followed by the partition is the wall through which the nozzle 20 projects, and is the wall toward which the throttle valve closes in oscillating clockwise on trunnions 22 and 23.

The carburetor and crank case design are intended to function at their best at a given velocity of charge through the manifold passage. The arrangement described is such that the charge of velocity through all portions of the manifold passage is correct at wide open throttle, and is also correct through the narrower portion of the passage when the throttle valve 25 is rotated to cut off the wider portion of the passage from the charge forming part thereof.

Thus, the arrangement described is such that the engine will operate at approximately maximum efficiency at two different speeds within its range and, as above indicated, such a charge forming and controlling device as that shown in Figs. 1, 2 and 4 is particularly useful where it is desired to have a motor which will operate with full efficiency at high speed, and which will also operate efficiently at a known low speed such as the speed which might be used if the engine were propelling a boat used for trolling.

In Fig. 3, I have shown the partition 30 supplemented by several additional partitions 31 and 32, further subdividing the manifold passage into narrow passages successively cut off by the throttle valve 25 in moving from its open toward its closed position. This arrangement is useful in that the engine may be made to operate economically at additional speeds throughout its range and, in fact, it will operate with approximate uniformity of efficiency at all speeds. It will be obvious that as the throttle valve closes one manifold passage after another, the velocity through the remaining passages will remain approximately constant until only one passage remains open to maintain the engine at a suitable idling or slow speed of operation.

The disposition of the carbureting nozzle 20 is such that it is not only in the path of air admitted to the passage last closed by the throttle valve, but is comparatively far removed from the path of air admitted to the manifold passage first closed by the throttle valve. By virtue of this arrangement it is possible to regulate the carburetion in general in accordance with engine requirements from a relatively lean mixture at high engine speeds, to a relatively rich mixture at low engine speeds. At all engine speeds, however, the air velocity through the manifold passages is sufficient to prevent accumulations of liquid fuel condensed on the wall of the manifold. All such fuel is swept by the air into the crank case, whence it passes to the cylinders in the usual way.

In my companion application for Patent No. 1,827,818 granted October 20, 1931, I disclose the use of a throttle valve to control the admission of air successively to two independent manifolds leading from a single carburetor to separate crank case ports opened and closed by separate crank case valves. The present invention attains many of the same advantages disclosed in said prior application and, in addition, is applicable to the more usual construction in which a single crank case valve is employed.

I claim:

1. In an engine, the combination with a crank shaft having a rotary valve crank cheek, of a crank case for said shaft provided at its end with a port opening radially and extending axially to the path of travel of said valve crank cheek to be regulated thereby, an inlet passage leading to said port, and partition means extending into said port and into operative proximity to said valve crank cheek, whereby said port is subdivided into separate ports successively controlled by said valve crank cheek.

2. In an engine, the combination with a crank shaft having a rotary valve crank cheek, of a crank case for said shaft provided at its end with a port opening radially and extending axially to the path of travel of said valve crank cheek to be regulated thereby, an inlet passage leading to said port, and partition means extending into said port and into operative proximity to said valve crank cheek, whereby said port is subdivided into separate ports successively controlled by said valve crank cheek, together with means for delivering mixture through said passage to said port, and means for regulating the proportionate delivery of mixture as between opposite sides of said partition means.

3. In an internal combustion engine, the combination with a charge admission valve and a crank case port controlled thereby, of a plurality of manifold passages leading to said port and each having valve port portions with which the valve coacts.

4. In an internal combustion engine, the combination with a charge admission valve and a crank case port controlled thereby, of a plurality of manifold passages leading to said port, and each having valve port portions with which the valve coacts and means for successively throttling said passages.

5. In an internal combustion engine, the combination with a charge admission valve and a crank case port controlled thereby, of a plurality of manifold passages leading to said port, and each having valve port portions with which the valve coacts and means for successively throttling said passages, together with carbureting means for supplying a combustible mixture to the several passages, said means being arranged to supply a richer mixture to one of said passages than to another.

6. A charge forming and controlling structure comprising a carburetor fitting having a restricted portion, a series of manifold passages divergent from said portion, a charge forming means adjacent one of said passages and relatively remote from another, and a segmental throttle valve housed within said fitting and movable across the remote passage toward said charge forming means.

7. The combination in an internal combustion engine of a crank case port, a valve controlling said port, a plurality of passages in said port, a charge forming device, and a manifold passage extending from said device to said port and longitudinally subdivided to provide a plurality of passages each extending to one of the above mentioned passages.

8. In an internal combustion engine, the combination of a plurality of adjacent intake passages including a plurality of port portions forming continuations thereof, a rotary valve operative to individually and successively control said port portions, means for introducing fuel into said passages and a throttle disposed to control said passages successively.

9. In an internal combustion engine the combination of a crank case, a crank shaft, and an intake manifold, said crank shaft having a crank cheek formed as an intake valve, a plurality of circumferentially disposed ports entering said crank case in a direction substantially parallel to said crank shaft and in position to be individually and successively controlled by said valve, said manifold being longitudinally subdivided into a plurality of intake passages each connecting with one of said ports, means for introducing fuel to said intake passages and a throttle valve disposed to successively control said passages.

FINN T. IRGENS.